United States Patent
Richter

(10) Patent No.: US 10,449,906 B2
(45) Date of Patent: Oct. 22, 2019

(54) STORAGE CABINET FOR USE IN A VEHICLE

(71) Applicant: Adrian Steel Company, Adrian, MI (US)

(72) Inventor: Thomas Scott Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 15/860,908

(22) Filed: Jan. 3, 2018

(65) Prior Publication Data

US 2018/0194294 A1    Jul. 12, 2018

Related U.S. Application Data

(60) Provisional application No. 62/443,190, filed on Jan. 6, 2017.

(51) Int. Cl.
| | |
|---|---|
| *B60N 3/12* | (2006.01) |
| *B60R 7/04* | (2006.01) |
| *A47B 88/40* | (2017.01) |
| *E05B 65/46* | (2017.01) |
| *E05B 7/00* | (2006.01) |
| *A47B 88/50* | (2017.01) |
| *E05B 47/02* | (2006.01) |
| *E05B 47/00* | (2006.01) |

(52) U.S. Cl.
CPC ............... *B60R 7/04* (2013.01); *A47B 88/40* (2017.01); *A47B 88/50* (2017.01); *E05B 7/00* (2013.01); *E05B 47/026* (2013.01); *E05B 65/46* (2013.01); *E05B 47/0004* (2013.01)

(58) Field of Classification Search
CPC .... E05B 65/462; E05B 65/46; G07F 17/0092; G07F 11/62; G07F 9/105; B25H 3/028; B25H 1/12; A47B 46/005; A61G 12/001
USPC ........................................................ 296/37.8
See application file for complete search history.

(56) References Cited

U.S. PATENT DOCUMENTS

| | | | | |
|---|---|---|---|---|
| 4,015,875 A | * | 4/1977 | Setina ..................... | B60R 21/12 296/24.46 |
| 4,082,391 A | * | 4/1978 | Turner ................... | A47B 77/10 126/332 |
| 4,095,837 A | * | 6/1978 | Hunter ....................... | B60J 1/20 296/24.41 |
| 4,173,369 A | * | 11/1979 | Roggin ................... | B60R 21/12 296/24.46 |
| 4,621,856 A | * | 11/1986 | McKenzie ............ | B60R 21/026 280/749 |
| 4,776,903 A | * | 10/1988 | Nordskog ............... | B64D 11/04 156/153 |
| 4,938,518 A | * | 7/1990 | Willemsen .......... | B60R 13/0823 160/330 |

(Continued)

*Primary Examiner* — Kiran B Patel
(74) *Attorney, Agent, or Firm* — Marshall & Melhorn, LLC

(57) ABSTRACT

One embodiment of a storage cabinet for use in a vehicle is described. The cabinet may have two side panels, a rear panel transverse to the side panels and a selectively openable top. A drawer is selectively located within the cabinet. A locking mechanism selectively locks the drawer within the cabinet. The locking mechanism has a solenoid and a solenoid plunger, and a locking flange. The plunger is selectively located within the locking flange to lock the drawer within the cabinet.

6 Claims, 6 Drawing Sheets

(56) References Cited

U.S. PATENT DOCUMENTS

| | | | | |
|---|---|---|---|---|
| 4,964,666 | A * | 10/1990 | Dillon | B60R 21/12 296/24.46 |
| 5,080,416 | A * | 1/1992 | Dirck | B60R 21/12 296/24.42 |
| 5,246,261 | A * | 9/1993 | McCormack | B60R 21/026 296/24.34 |
| 5,536,057 | A * | 7/1996 | Stewart | B60R 7/04 296/24.46 |
| 5,662,373 | A * | 9/1997 | Hanemaayer | B60P 3/38 296/164 |
| 6,474,713 | B1 * | 11/2002 | Ruck | B60R 21/026 280/748 |
| 7,090,274 | B1 * | 8/2006 | Khan | B60N 2/36 296/37.14 |
| 7,318,614 | B2 * | 1/2008 | Steiger | B62D 33/042 296/24.4 |
| D566,649 | S * | 4/2008 | Panasewicz | D12/426 |
| 7,694,981 | B2 * | 4/2010 | Heath | A47B 31/00 280/47.26 |
| 7,731,255 | B2 * | 6/2010 | McJunkin | B60P 7/14 296/24.4 |
| 7,806,452 | B2 * | 10/2010 | Storer | B60R 21/12 280/749 |
| 7,909,379 | B2 * | 3/2011 | Winget | B60R 21/026 296/24.43 |
| 8,157,337 | B2 * | 4/2012 | Manalang | B25H 3/06 312/249.8 |
| 8,668,209 | B1 * | 3/2014 | Anzivino | B62B 1/002 280/47.12 |
| 8,690,216 | B2 * | 4/2014 | Sage | B60R 21/12 296/24.42 |
| 9,145,208 | B2 * | 9/2015 | Hacker | A47B 96/025 |
| 9,321,402 | B2 * | 4/2016 | Nedelman | B60R 11/06 |
| 10,106,206 | B1 * | 10/2018 | Baccouche | B62D 29/046 |
| 10,124,896 | B2 * | 11/2018 | Sieben | B64D 11/04 |
| 10,183,643 | B2 * | 1/2019 | Paunov | B60R 21/026 |
| 2009/0314889 | A1 * | 12/2009 | Baatz | B64D 11/0007 244/118.5 |
| 2017/0015254 | A1 * | 1/2017 | Wilson | B60R 9/065 |
| 2017/0247005 | A1 * | 8/2017 | Richter | B60R 21/026 |
| 2018/0079366 | A1 * | 3/2018 | Lundberg | B60R 7/14 |
| 2018/0086277 | A1 * | 3/2018 | Wilson | B60R 5/045 |
| 2018/0228121 | A1 * | 8/2018 | Murray | A01K 1/0035 |
| 2018/0361880 | A1 * | 12/2018 | Bryant | B60N 2/012 |
| 2019/0023191 | A1 * | 1/2019 | Rios | B60R 11/02 |
| 2019/0037799 | A1 * | 2/2019 | Murray | A01K 1/0272 |
| 2019/0126836 | A1 * | 5/2019 | Navarro | B60R 5/003 |

* cited by examiner

STORAGE CABINET FOR USE IN A VEHICLE

FIELD OF THE DEVICE

The device relates to a storage cabinet for use in a vehicle. More particularly, the device relates to a storage cabinet for use in the vehicle that provides storage in a partition located between a cargo portion and a passenger portion of the vehicle.

BACKGROUND

Delivery vehicles for delivering many kinds of items are well-known. In some cases, the vehicles are not well adapted for their purpose. These vehicles do not have the storage for storing and securing the items they are delivering. As a result, vehicle delivery operators simply locate the items to be delivered on empty vehicle seats. These items undesirably move about the vehicle, fall on the vehicle floor and/or fall out of the vehicle resulting in lost time, damage to the items, and inefficiency in the delivery process.

Storage devices for cargo or working vehicles are also well-known. The prior art devices, however, suffer from several disadvantages that often discourage users from using them effectively. For example, some storage devices are not customized to the packages or items they are designed to store. As a result, the packages, for example, move about in the vehicle, or within the storage device, as the vehicle moves from place to place. The movement causes the packages to become disorganized and/or damaged, and may even pose a danger of getting in the way of the vehicle operator during operation of the vehicle.

Other storage devices do not locate items that are needed by the vehicle occupants in an efficient or convenient manner. As a result, the storage devices are not used at all, or when they are, the vehicle occupants have to take additional movements and effort to obtain what they need from the storage devices. These additional movements and effort can take additional time and lead to frustration and inefficiency.

Additionally, and unfortunately, theft of the items in the vehicle has become an issue. These items, because they are often not put away in storage devices, are left in plain sight. Small items left on empty vehicle seats are easy targets for light-fingered opportunists.

Based on the disadvantages associated with known delivery vehicles and vehicle storage devices, it would be advantageous to have a device for storing items in the vehicle. Further, it would be advantageous for the storage device to be customized to the number and shape of the items to be stored. In addition, it would be advantageous to have this storage device at a convenient and easily accessible location for the vehicle operator and/or occupants so that they can do their work as efficiently as possible. Further yet, it would be advantageous if the device could be selectively secured to reduce the likelihood of theft of the items.

SUMMARY

One embodiment of a storage cabinet for use in a vehicle is described. The cabinet may have two side panels, a rear panel transverse to the side panels and a selectively openable top. A drawer is selectively located within the cabinet. A locking mechanism selectively locks the drawer within the cabinet. The locking mechanism has a solenoid and a solenoid plunger, and a locking flange. The plunger is selectively located within the locking flange to lock the drawer within the cabinet.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION OF THE PREFERRED EMBODIMENTS

Figure 1:
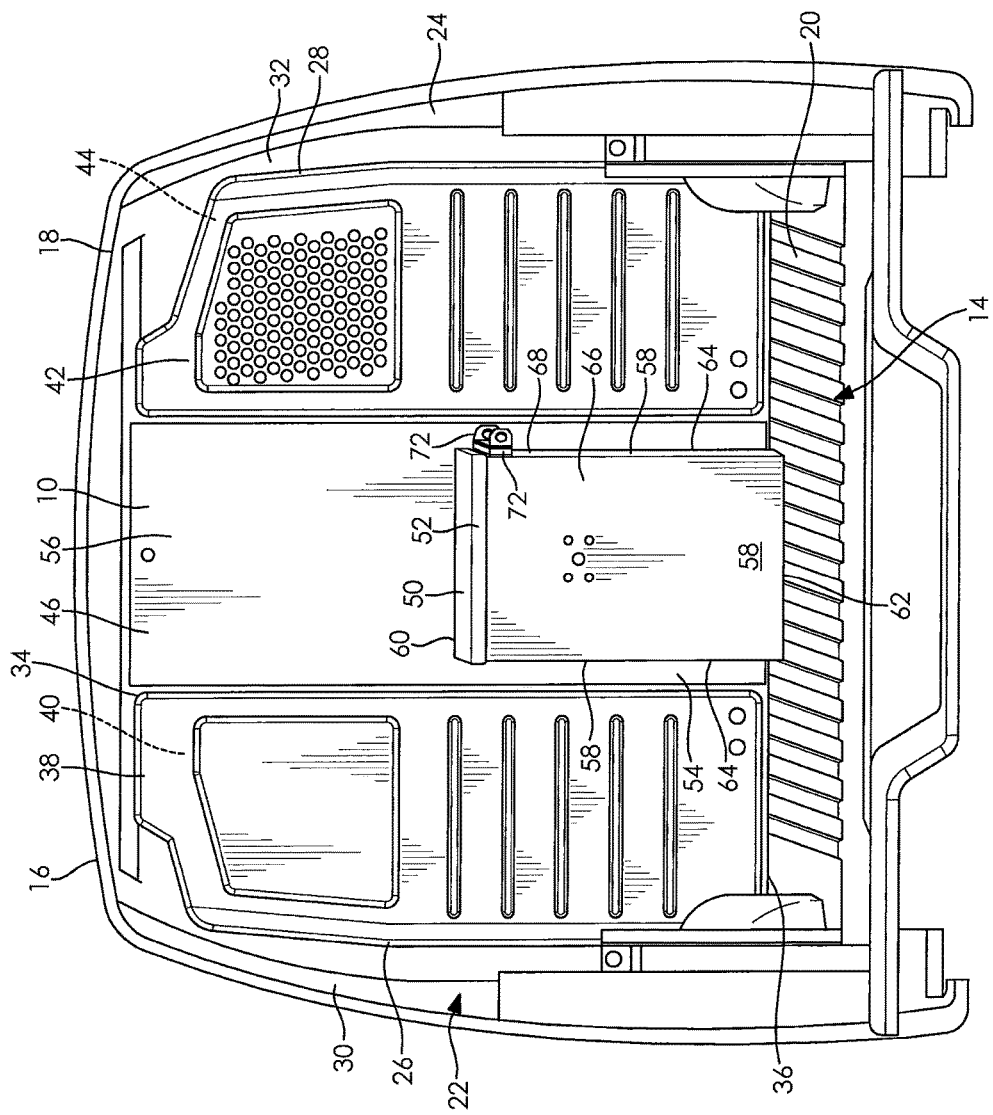
FIG. 1 is a partial schematic view of one embodiment of a cargo area of a vehicle wherein one embodiment of a storage cabinet and a partition separating the cargo area from a passenger area are depicted, where the cargo side of the storage cabinet is in a closed orientation.

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Turning now to figures, a vehicle partition 10 dividing a passenger area 12 from a cargo area 14 of a vehicle 16, such as, but not limited to a cargo van, is depicted. In the depicted embodiment the partition 10 continuously extends from a ceiling 18 of the vehicle 16 to a floor 20 of the vehicle 16. The partition 10 also continuously extends from one side 22 of the vehicle to the other side 24 of the vehicle 16. Preferably, sides 26, 28 of the partition 10 are secured to the B-pillars 30, 32 of the vehicle 16, such as with brackets and the like (not shown). Top and bottom portions 34, 36 of the partition 10 may be secured to the ceiling 18 and floor 20 with brackets and mechanical fasteners (not shown).

In the depicted embodiment, the partition 10 comprises three sections. As may be best appreciated from FIG. 3, a first section 38 of the partition 10 is located behind a driver's area 40, which may contain the driver's seat (not shown). A second section 42 of the partition 10 is located behind a passenger's area 44, which may contain the passenger's seat (not shown). A third section 46 is located between the first and second sections 38, 42.

Preferably, each of the sections 38, 42, 46 is primarily constructed of the same material, such as stamped steel. While stamped steel is preferred, other materials such as plastics, composites, other metals, and/or wood may be used.

The first and second sections 38, 42 are comprised of stationary components that primarily reside in a single vertical plane. Preferably, the first and second sections 38, 42 extend continuously from the floor 20 of the vehicle 16 to the ceiling 18 of the vehicle 16. The first and second sections 38, 42 may be secured to the floor 20 and ceiling 18 through brackets and mechanical fasteners (not shown). The first and second sections 38, 42 may be removed from the vehicle 16 but preferably remain primarily fixed thereto and they are designed to be stationary during operation of the vehicle 16.

The first and/or second sections 38, 42 may be solid or they may have windows, vents, and/or apertures that permit air and/or light to pass from the cargo area 14 to the passenger area 12 and vice versa. The figures depict the first section 38 as solid, and the second section 42 has a plurality of air/light apertures 48, but the partition sections can be switched with one another.

Figure 2:
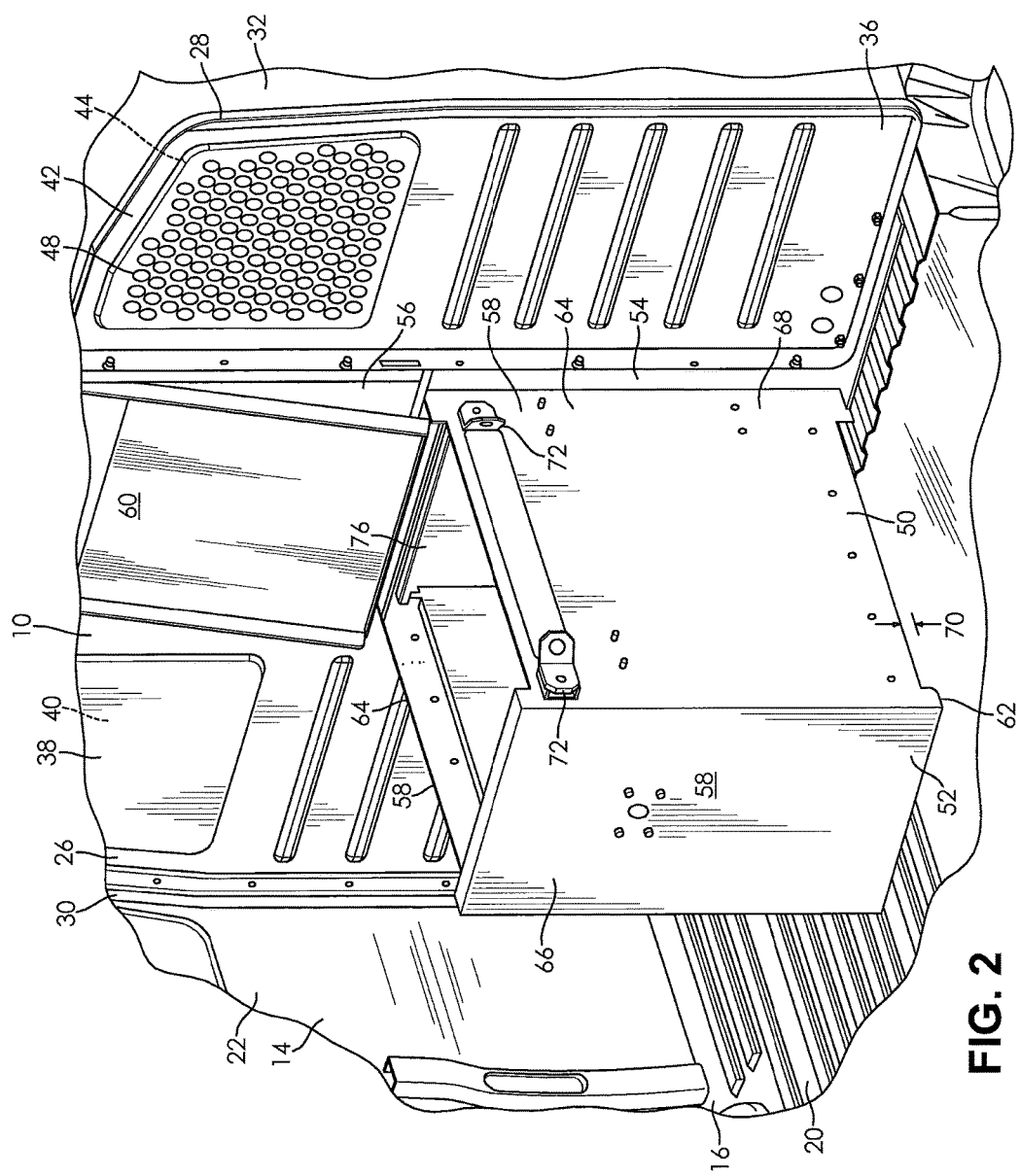
FIG. 2 is a partial perspective view of the items in FIG. 1 with the cargo side of the storage cabinet in an open orientation.

The third section 46 comprises a cabinet 50, or locker. As may be seen in FIGS. 1 and 2, the cabinet 50 comprises a cargo portion 52. The cargo portion 52 extends into the cargo area 14 of the vehicle 16. As shown in FIGS. 1 and 2, the cargo portion 52 extends axially beyond the partition 10 into vehicle cargo area 14. The embodiment depicted in FIGS. 1 and 2 depicts the cabinet 50 as extending axially from the third section 46 and a lower portion 54 of the third section 46. An upper portion 56 of the third section 46 may be planar with the first and second sections 38, 42. The third section 46, and thus the cabinet 50, may be centered on the partition 10. The first, second, and third sections 38, 42, 46 may be substantially equal in length.

The cargo portion 52 of the cabinet 50 may be comprised of three joined sides 58, a top 60 and a bottom 62. The three joined sides 58 comprise two fixed side panels 64 and a fixed rear panel 66. The panels are fixed to one another and they may also be fixed to the floor 20 of the vehicle 16. The two side panels 64 may be parallel but nonplanar with one another. The rear panel 66 may be located transverse to the side panels 64. The rear panel 66 and the side panels 64 are transverse to the vehicle floor 20. Each of the panels 64, 66 reside primarily in their own plane and within their respective planes they are constant. In the depicted embodiment, the panels 64, 66 define a rectangular box.

A passenger side panel 68 may not extend entirely to the vehicle floor 20. Instead, a gap 70 may exist between the side panel 68 and the vehicle floor 20. The gap may extend substantially the length of the side panel 68. The gap 70 is designed to selectively accommodate the tongue of a dolly or hand cart (not shown) therein. Two tie downs 72 are also secured to the side panel 68. Straps (not shown) to secure the hand cart to the side panel 68 may be attached to the tie downs 72.

Figure 8:
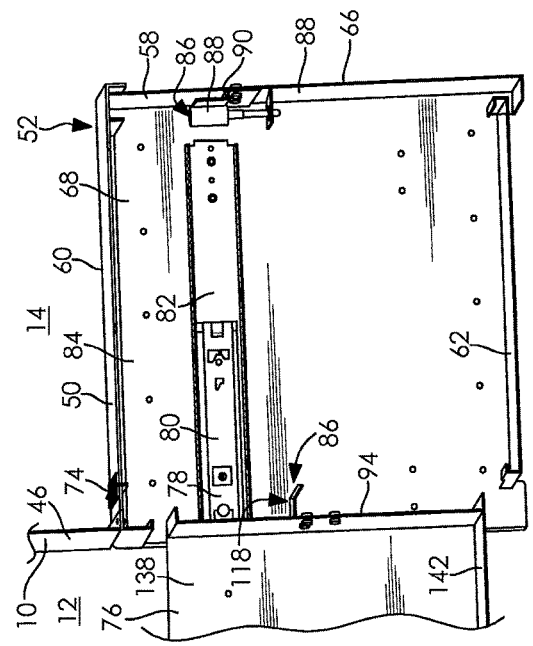
FIG. 8 is a partial schematic perspective view of a cut-away portion of the storage cabinet depicting the locking mechanism and a slide for the drawer.

The top 60 may be selectively opened and closed. FIG. 1 depicts the top 60 in the closed orientation while FIG. 2 depicts the top 60 in an open orientation. The top 60 may be hinged adjacent the partition 10 so as to be selectively opened and closed. FIG. 8 partially depicts the hinge 74. The top 60 extends transverse the side panels 64 and the rear panel 66. The top 60 continuously extends at least from one side 64 to the other side 64 and from the hinge 74 to at least the rear panel 66.

The top 60, side panels 64 and rear panel 66 define an enclosed volume therein. A drawer 76 may be selectively located within, and at least partially removed from, the volume. The drawer 76 may be moved into and out of the volume as it is mounted on at least one slide 78. One of the slides 78 is depicted in FIG. 8. FIG. 8 shows one part 80 of the slide 78 mounted to a side panel 64, while the other part of the slide 82 is mounted to the drawer 76. The part 80 of the slide 78 mounted to the side panel 64 is directly mounted to an inside surface 84 of the side panel 64. The slide 78 may be mounted to the side panel 80 such as through one or more mechanical fasteners. Preferably, a second slide, located opposite the first slide on the opposite side panel interior surface is also connected to the drawer 76 to facilitate operation of the drawer 76.

Figure 5:
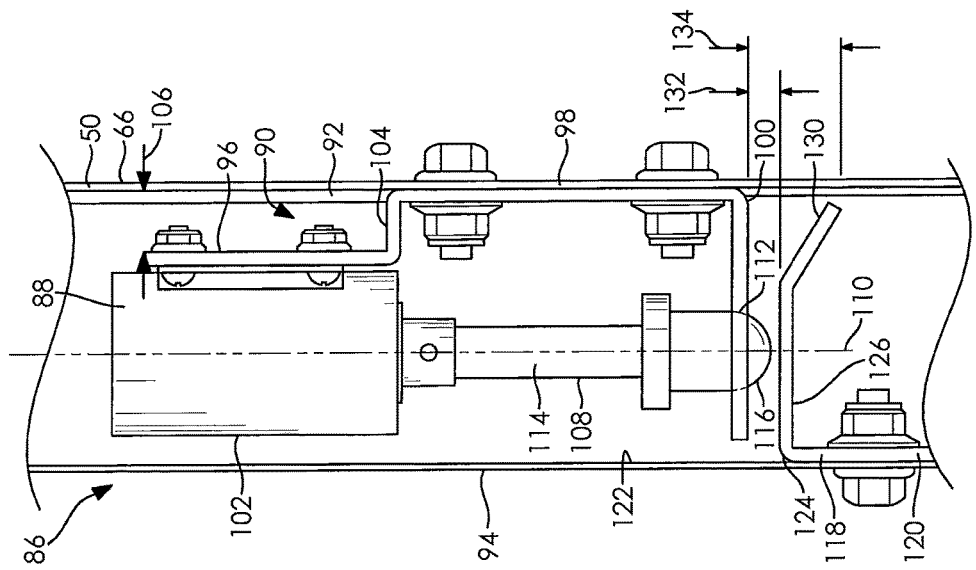
FIG. 5 is a partial schematic view of one embodiment of a locking mechanism for the storage cabinet in a locked orientation.
Figure 6:
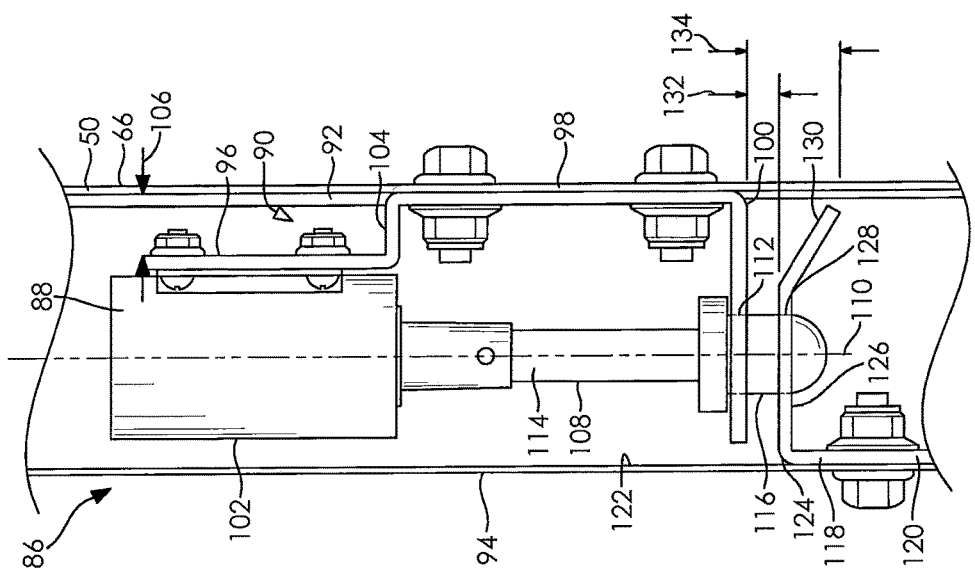
FIG. 6 is the locking mechanism for the storage cabinet of FIG. 5 in an unlocked orientation.
Figure 7:
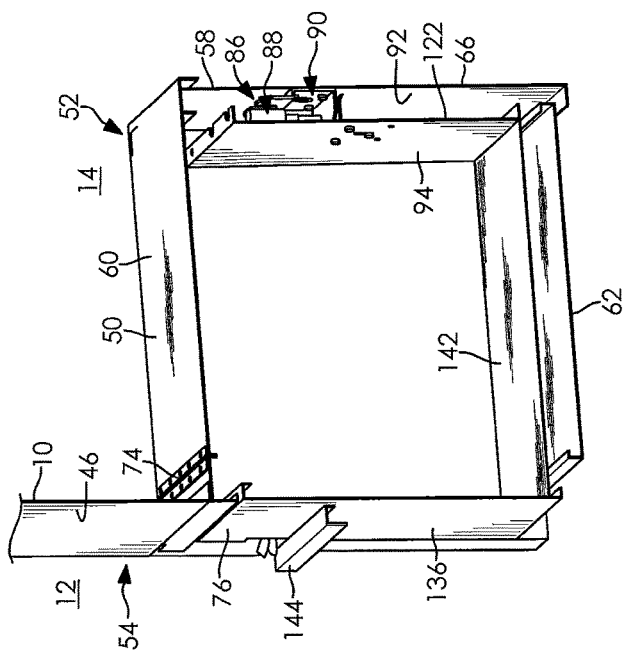
FIG. 7 is a partial schematic perspective view of a cut-away portion of the storage cabinet with the locking mechanism.

With continued reference to FIG. 8, a locking mechanism 86 is depicted for the drawer 76. The locking mechanism 86 may be comprised of a solenoid device 88 and a mount 90 for the solenoid device 88. The locking mechanism 86 is directly attached to an inner wall 92 of the rear panel 66 between the inner wall 92 and a back 94 of the drawer 76. FIGS. 5, 6, and 7 also depict the solenoid device 88 and the mount 90.

The mount 90 comprises an upper portion 96, a central portion 98 and a lower portion 100. The upper portion 96 is attached to an upper body 102 of the solenoid device 88. The central portion 98 is directly attached to the rear panel 66, such as by one or more mechanical fasteners. The upper portion 96 may have an axially extending stand-off portion 104 from the rear panel 66 to provide a gap 106 between the upper portion 96 and rear panel 66. The stand-off portion 104 provides clearance for a solenoid plunger 108 extending from the solenoid device 88 along an axis 110 common to both.

The lower portion 100 extends transverse from the central portion 98 and the rear panel 66. The lower portion 100 has an aperture 112 extending therethrough. The aperture 112 functions as a guide for the solenoid plunger 108.

The solenoid plunger 108 is comprised of a shaft portion 114 that is selectively moved up or down by the solenoid device 88. An engagement portion 116 is attached to an end of the shaft portion 114. FIG. 6 shows the engagement portion 116 in the unlocked orientation where the engagement portion 116 is not engaged with a locking flange 118 attached to the back 94 of the drawer 76. The locking flange 118 may be such as an L-shaped structure where the first leg 120 of the L is directly attached to a rear wall on the back 94 of the drawer 76, while a second leg 124 of the L extends transverse the first leg 120 and the rear wall 122.

The second leg 124 may be comprised of two portions. An inner portion 126 may be directly connected to the first leg 120. The inner portion 126 may have an aperture 128 therethrough for selectively receiving the engagement portion 116 therein.

An outer portion 130 may be directly connected to the inner portion 126 and it may be angled. The outer portion 130 may have a gap of a first distance 132 between the outer portion 130 and the lower portion 100 of the mount 90 and a gap of a second distance 134 between the outer portion 130 and the lower portion 100 of the mount 90 because of the angle. The second distance 134 is larger than the first distance 132.

FIG. 5 depicts the engagement portion 116 in a locked orientation where the engagement portion 116 is engaged with the aperture 128 in the locking flange 118. In this orientation, the drawer 76 cannot be pulled from the cabinet 50. When the engagement portion 116 is not located in the locking flange aperture 128, the drawer 76 can be removed from the cabinet 50.

The solenoid plunger 108 is normally biased in the extended, or lowered, or locked position when the vehicle 16 is in the key-off state. Thus, the drawer 76 cannot be removed from the cabinet 50 when the vehicle 16 is turned off, which as the effect of preventing unauthorized access to the cabinet 50.

The cabinet 50 can also be locked simply by closing it when the vehicle 16 is off. For example, if the drawer 76 is initially in the opened or extended position, and the vehicle 16 is turned off, the solenoid plunger 108 will be biased in the lowered or locked position. When the drawer 76 is pushed closed into the cabinet 50, the engagement portion 116 of the plunger 108 slides up the ramp, or angled portion, of the outer portion 130 of the second leg 124, which causes the plunger 108 to initially retract. The plunger 108 slides along the ramp 130 to the inner portion 126 of the locking flange 118. The plunger 108 then drops into the aperture 128 of the inner portion 126 of the locking flange 118, which prevents the drawer 76 from being pulled from the cabinet 50.

Turning now to at least FIGS. 3, 4, 7 and 8, one embodiment of the drawer 76 is depicted. The drawer 76 may have a front 136, the back 94, a first side 138, a second side 140 and a bottom 142. The drawer 76 may be unitary but preferably, individual pieces 136, 94, 138, 140, 142 are unitary and then connected together such as by welding or mechanical fasteners.

The front 136 may have a handle 144 that is attached to the slides 78. By biasing the handle 144 up or down, the handle 144 releases the slides 78 so that the drawer 76 can be pulled from the cabinet 50. The slides 78 can be those that lock in the extended position if so desired.

The front 136 and back 94 are parallel but axially offset from one another. The bottom 142 is transverse the front 136, back 94, the first side 138 and the second side 140.

The front 136 is substantially transverse the two parallel sides 138, 140. The drawer sides 138, 140 remain parallel the cabinet sides 64 whether the drawer 76 is extended from the cabinet 50 or located in the cabinet 50.

Figure 3:
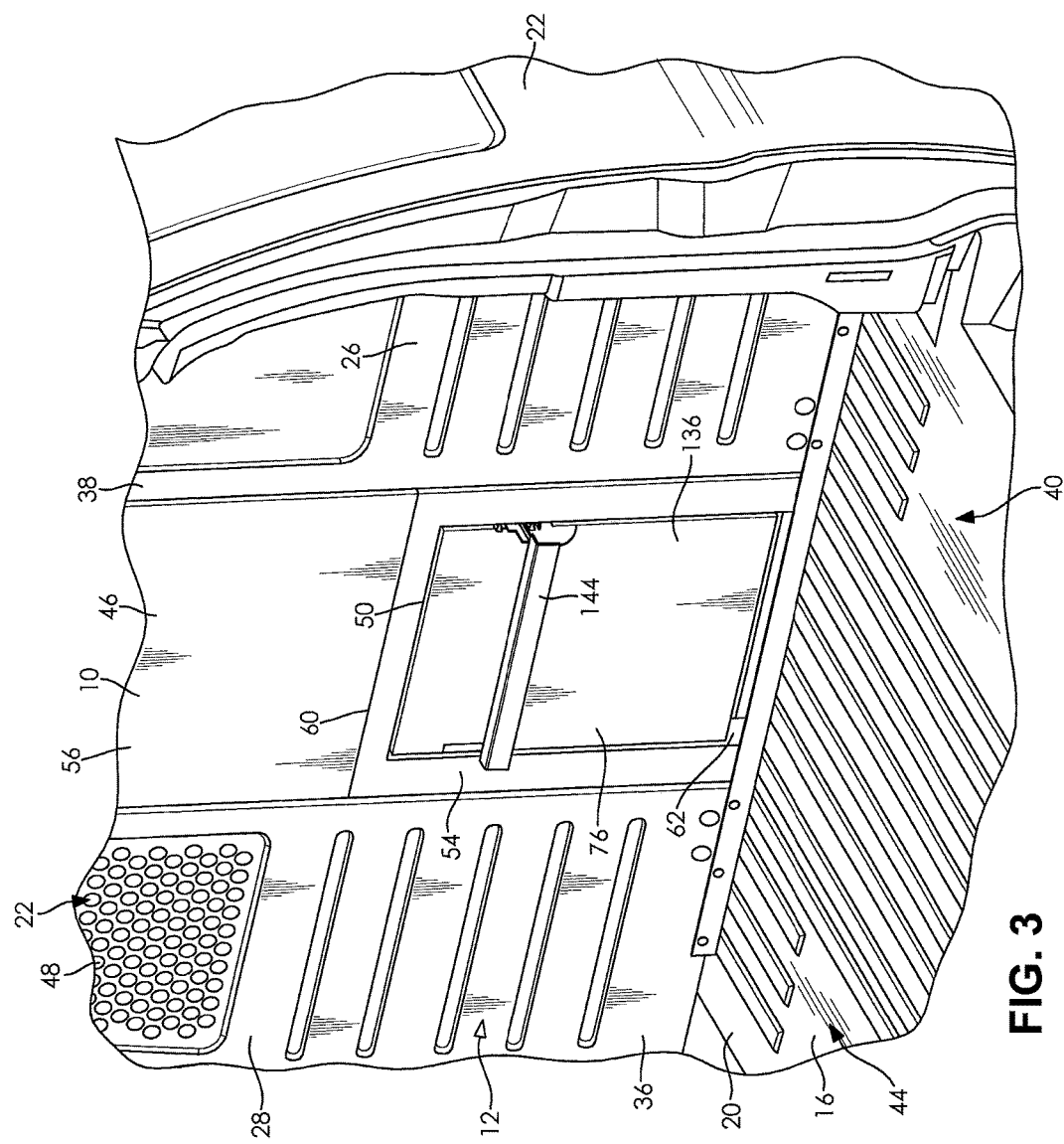
FIG. 3 is a partial perspective view of the storage cabinet and the partition of FIGS. 1 and 2 from the passenger area of the vehicle, where the passenger side of the storage cabinet is in a closed orientation.
Figure 4:
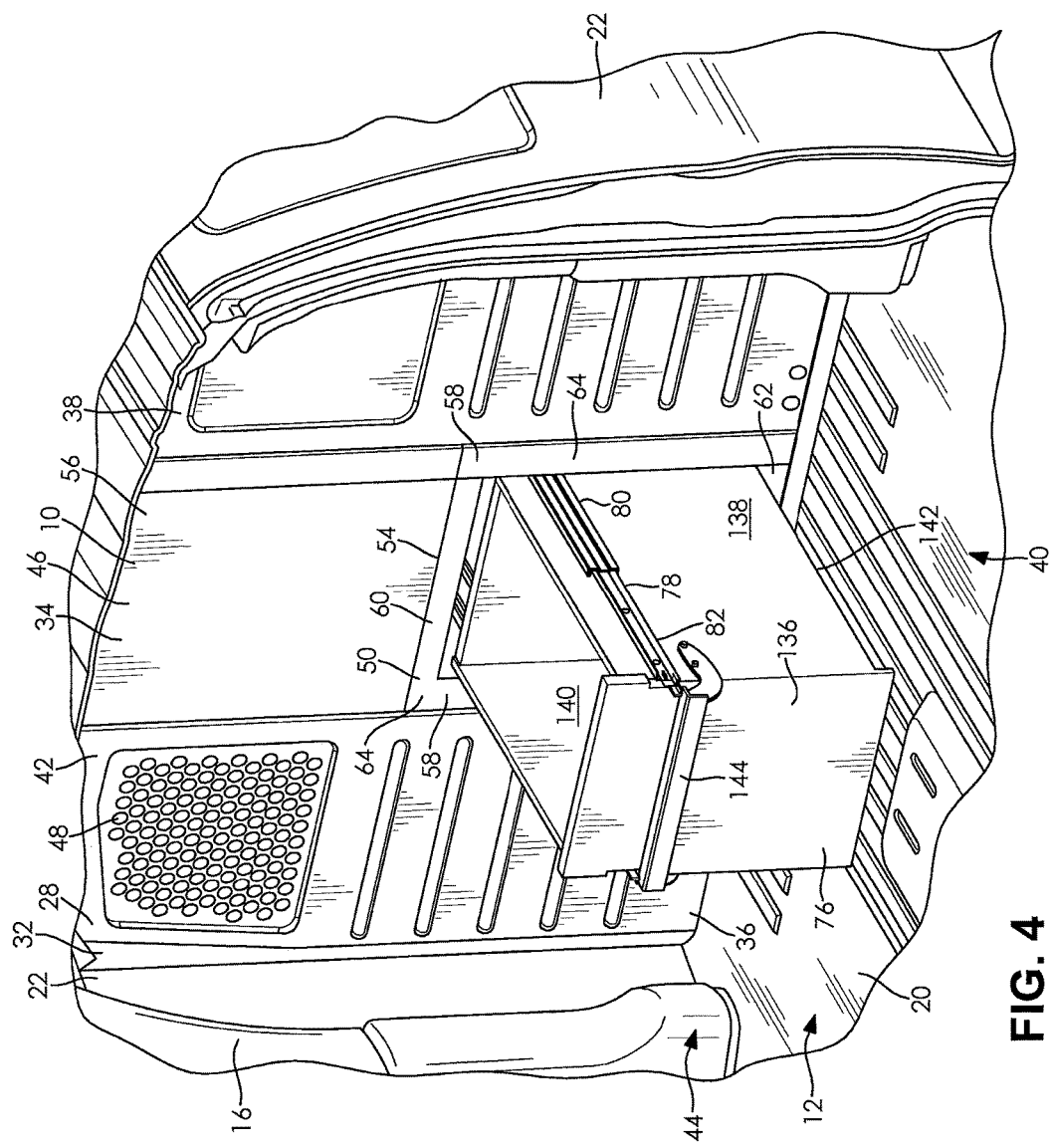
FIG. 4 is a partial perspective view of the items in FIG. 3 from the passenger side of the storage cabinet in an open orientation.

The drawer 76 is effectively an open topped box that can be selectively located in the cabinet 50, which can be appreciated from at least FIGS. 3, 7 and 8. As noted above, the drawer 76 can be selectively removed from the cabinet 50, as shown in FIG. 4. FIG. 4 depicts the drawer 76 extended from the cabinet 50 into the passenger area 12 so that the passenger (i.e., driver) can access the contents of the drawer 76. This permits the passenger to access the contents of drawer 76 without exiting the vehicle 16 and entering into the cargo area 14. From FIG. 2 it can also be appreciated that the cabinet 50 and the drawer 76 can also be accessed from the cargo area 14 when the drawer 76 is located within the cabinet 50.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A storage cabinet, comprising:
    a partition for separating a cargo area from a passenger area;
    the cabinet connected to the partition and extending into the cargo area, wherein the cabinet comprises two side panels, a rear panel transverse to the side panels and a selectively openable top transverse the two side panels;
    a drawer located within the cabinet, wherein the drawer stores in the cabinet in the cargo area and extends into the passenger area, wherein the drawer is connected to the cabinet through at least one slide;
    a locking mechanism locks the drawer within the cabinet, wherein the locking mechanism comprises a solenoid and a solenoid plunger, the solenoid attached to the cabinet, and a locking flange attached to the drawer, wherein the plunger is located within the locking flange to lock the drawer within the cabinet.

2. The storage cabinet of claim 1, wherein said drawer has a front that is planar with said partition when said drawer is located in the cabinet.

3. The storage cabinet of claim 1, wherein said two side panels extend axially transverse from said partition.

4. The storage cabinet of claim 1, wherein a tongue gap extends along at least a portion of one of the side panels, and exists between the vehicle floor and the same side panel.

5. The storage cabinet of claim 1, wherein the openable top is hinged adjacent the partition.

6. The storage cabinet of claim 1, wherein said cabinet and said drawer are centered with respect to said partition.

* * * * *